United States Patent
Partridge

(10) Patent No.: US 10,292,527 B2
(45) Date of Patent: May 21, 2019

(54) REFLECTOR OVEN

(71) Applicant: Benjamin R. Partridge, Springville, UT (US)

(72) Inventor: Benjamin R. Partridge, Springville, UT (US)

( * ) Notice: Subject to any disclaimer, the term of this patent is extended or adjusted under 35 U.S.C. 154(b) by 308 days.

(21) Appl. No.: 15/216,174

(22) Filed: Jul. 21, 2016

(65) Prior Publication Data

US 2017/0020330 A1    Jan. 26, 2017

Related U.S. Application Data

(60) Provisional application No. 62/195,219, filed on Jul. 21, 2015.

(51) Int. Cl.
*A47J 33/00* (2006.01)
*F24B 1/182* (2006.01)
*F24C 1/10* (2006.01)

(52) U.S. Cl.
CPC ............... *A47J 33/00* (2013.01); *F24C 1/10* (2013.01); *F24B 1/182* (2013.01)

(58) Field of Classification Search
CPC .................................. A47J 33/00; F24B 1/182
USPC ..................................... 126/274, 9 R, 21 A
See application file for complete search history.

(56) References Cited

U.S. PATENT DOCUMENTS

| | | | |
|---|---|---|---|
| 44,175 A | | 9/1864 | Foote |
| 216,003 A | * | 3/1879 | Watson |
| 449,432 A | * | 3/1891 | Watson |
| 548,499 A | * | 10/1895 | Ashmore |
| 897,459 A | * | 9/1908 | Grant |
| 1,216,008 A | * | 2/1917 | Chstonebridge ........ F24B 1/205 126/274 |
| 1,490,274 A | * | 4/1924 | Ivey ........................ F24B 1/205 126/274 |
| 2,543,115 A | * | 2/1951 | Lindstaedt .............. F24B 1/205 126/274 |
| 2,580,925 A | * | 1/1952 | Jarvis ...................... F24B 1/205 126/14 |
| 2,757,664 A | | 8/1956 | McDowell |
| 2,921,577 A | * | 1/1960 | Smith ................. A47J 37/0763 126/274 |
| 2,969,055 A | | 1/1961 | Martin |
| 3,026,866 A | | 3/1962 | Lynch |
| 3,067,737 A | * | 12/1962 | Brown ................ A47J 37/0763 126/274 |
| 3,898,980 A | | 8/1975 | Reimann |
| 4,535,753 A | | 8/1985 | Zayauskas |
| 4,672,944 A | * | 6/1987 | Curry ................. A47J 37/0704 126/25 R |
| 4,881,519 A | * | 11/1989 | Henke .................... A21B 1/245 126/21 A |
| 4,971,045 A | * | 11/1990 | Probst ..................... F24B 1/205 126/29 |

(Continued)

*Primary Examiner* — Gregory L Huson
*Assistant Examiner* — Nikhil P Mashruwala
(74) *Attorney, Agent, or Firm* — Geoffrey E. Dobbin; Dobbin IP Law P.C.

(57) ABSTRACT

A reflector oven has at least two sets of ventilation holes which double as holes for pan and oven support. The oven may be set for use with either a cookie sheet or similar flat sheet or a muffin tin or similarly constructed pan. Placing support rods through on set of holes allows for one pan while placing them through the other set allows for the other pan.

6 Claims, 5 Drawing Sheets

(56) References Cited

U.S. PATENT DOCUMENTS

| | | | |
|---|---|---|---|
| 5,983,887 A | 11/1999 | Bourgeois | |
| 2004/0007229 A1 | 1/2004 | Sproul | |
| 2008/0105249 A1* | 5/2008 | McFadden | A21B 1/245 |
| | | | 126/21 A |
| 2018/0055280 A1* | 3/2018 | Artig | F24B 1/205 |

* cited by examiner

REFLECTOR OVEN

CROSS-REFERENCES TO RELATED APPLICATIONS

This Application claims priority as a non-provisional perfection of prior filed U.S. application No. 62/195,219, filed Jul. 21, 2015, and incorporates the same by reference in its entirety herein.

FIELD OF THE INVENTION

The present invention relates to the field of cooking equipment and more particularly relates to a reflector oven used with a radiant heat source, such as a campfire.

BACKGROUND OF THE INVENTION

The reflector oven is a well-known item of camping equipment. The principle of a reflector oven is simple: collect radiant heat from a source, like a campfire, and reflect it onto a baking surface or food item in the middle of the oven. The collected heat is usually enough, assuming sufficient size of the heat source, to bake food or any other item desired to be heated. Prior art reflector ovens typically have top and bottom panels which primarily collect and direct heat, and some form of rack structure to hold food, or some other item, in the center of the top and bottom panels, thus allowing most efficient cooking and heating. They may or may not have two side panels or a frame to help support the top and bottom panels.

While adequate for basic purposes, prior art reflector ovens tend to be flimsy, as a concession to the fact they are most used while a person is camping or backpacking and thus have a limited amount of material they can carry. They also feature few parts, for easy construction and to reduce the possibility of part loss. Reflector ovens tend to not be very deep, and thus can only hold small portions of food for cooking. They also tend to not cook evenly, requiring movement of the oven or the food for adequate cooking of the food. The present invention is a reflector oven which addresses these issues.

A reflector oven represents a departure from the prior art if it allows for a greater height and depth so as to allow greater volumes of food to be cooked and if it provides ventilation holes to foster more even cooking without manipulating the oven itself. Such an oven must still be reasonably easy to carry and feature few parts so that it may be ported, assembled, disassembled, and have disassembled parts easily collected to inhibit loss.

SUMMARY OF THE INVENTION

In view of the foregoing disadvantages inherent in the known types of reflector ovens, a new reflector oven with a more effective structure is provided. As such, the reflector oven's general purpose is to cook food in a more efficient manner, allowing more food to be cooked in a more even fashion.

To accomplish these objectives, a reflector oven may comprise top and bottom panels which feature a curved back fin. When assembled the curved back fins of these panels will join, creating more volume in the oven. It may also comprise side panels, which also join with the top and bottom panels, and rods which may hold the panels together and also double as a rack for cooking food. Holes in the side panels may be provided for both the rods and for ventilation. Placement of the holes and choosing which ones to use with the rods may allow for two types of pans to be used in the reflector oven and also still accommodate ventilation. Cut-out handles may be provided in the side panels for easier manipulation of the oven.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiments of the reflector oven are herein described. It should be noted that the articles "a," "an," and "the," as used in this specification, include plural referents unless the content clearly dictates otherwise. While the purpose of a reflector oven is primarily to cook food, it is to be understood that any suitable item could be heated within a reflector oven, much like a conventional oven. Therefore, this Specification has used and will continue to use the terms "food" and "cook" for simplicity, but the terms should be understood to include any item suitable for heating in an oven and the action of doing so, respectively.

Figure 1:
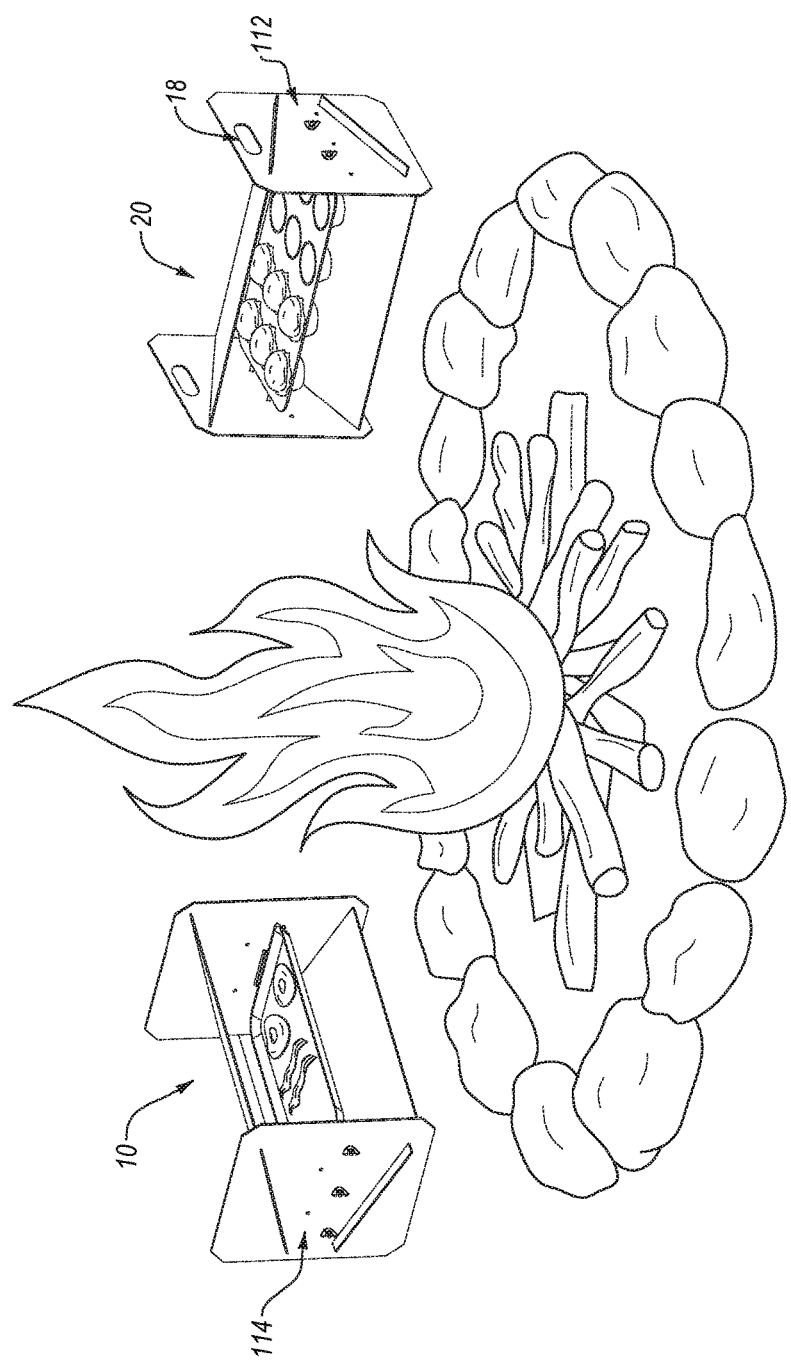
FIG. 1 is a perspective view of two embodiments of a reflector oven of the present invention in use.

With reference to FIG. 1, two possible embodiments of a reflector stove are shown in use. The first, 10, is being use to cook bacon and eggs on a cookie sheet 150 held within the oven. It features hand holes 128 to facilitate grabbing and adjusting the position of the reflector oven. The second, 20, is being used to bake muffins in a muffin tin 160 and does not have the hand holes. Other than the presence of hand holes 128 and set-up, these ovens are identical in every respect.

Figure 2:
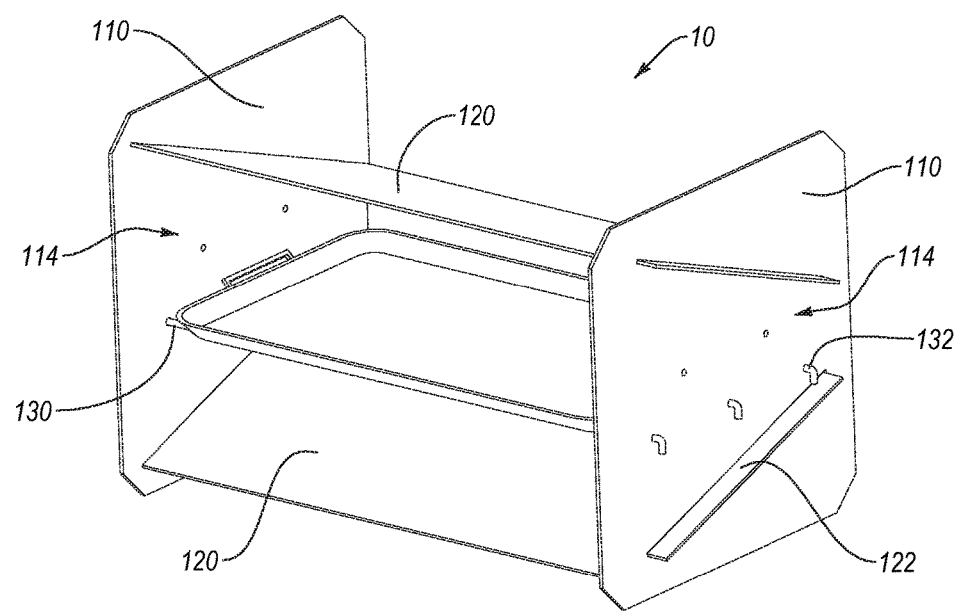
FIG. 2 is a front perspective view of one of the embodiments of the reflector oven in FIG. 1.
Figure 3:
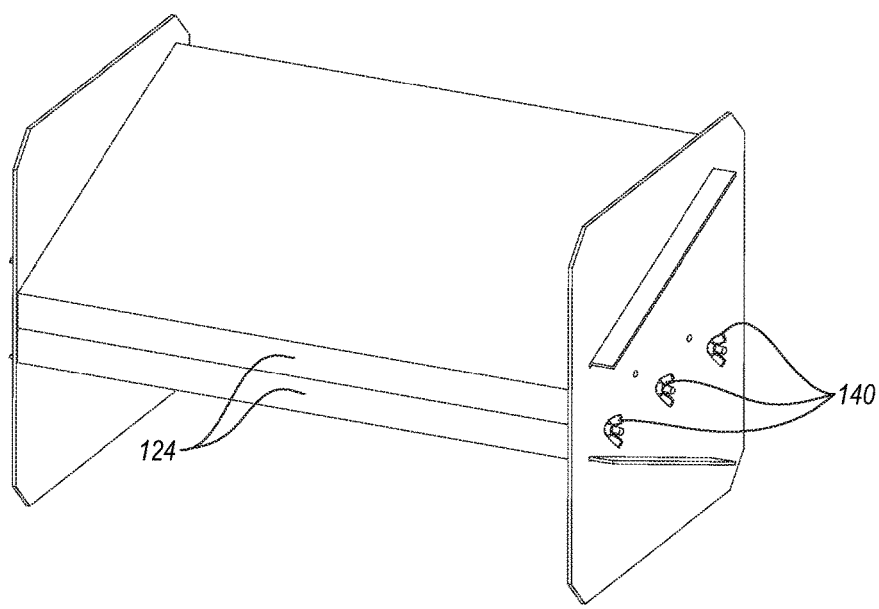
FIG. 3 is a rear perspective view of the reflector oven of FIG. 2.
Figure 4:
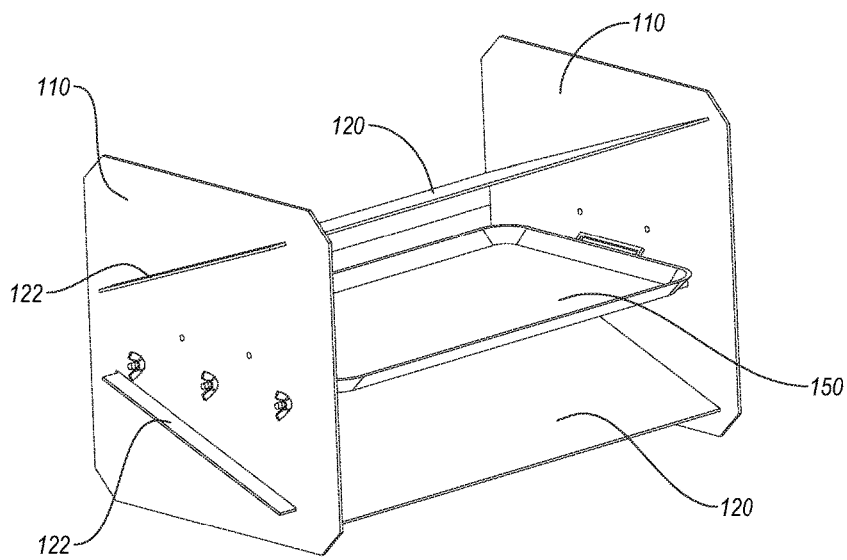
FIG. 4 is an alternate front perspective view of the reflector oven of FIG. 2.
Figure 7:
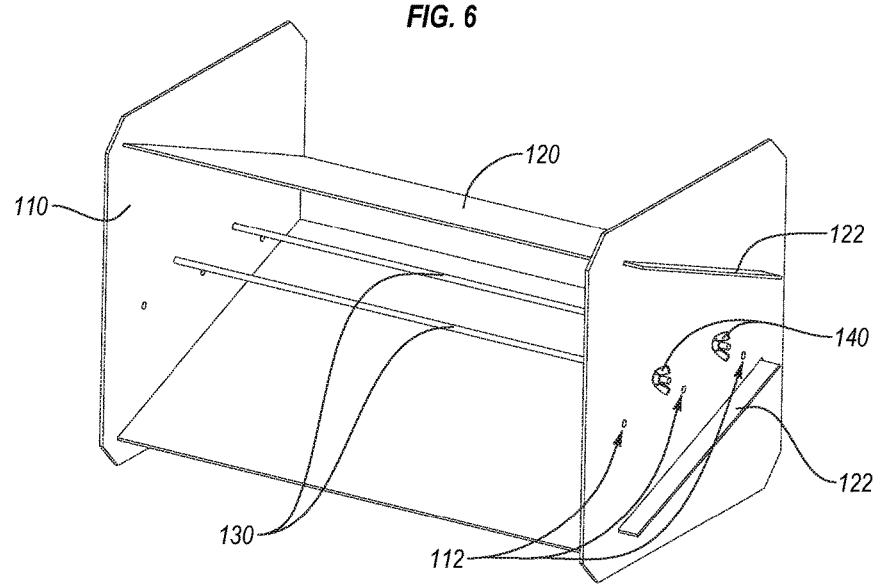
FIG. 7 is the reflector oven of FIG. 6, with the muffin tin removed.
Figure 8:
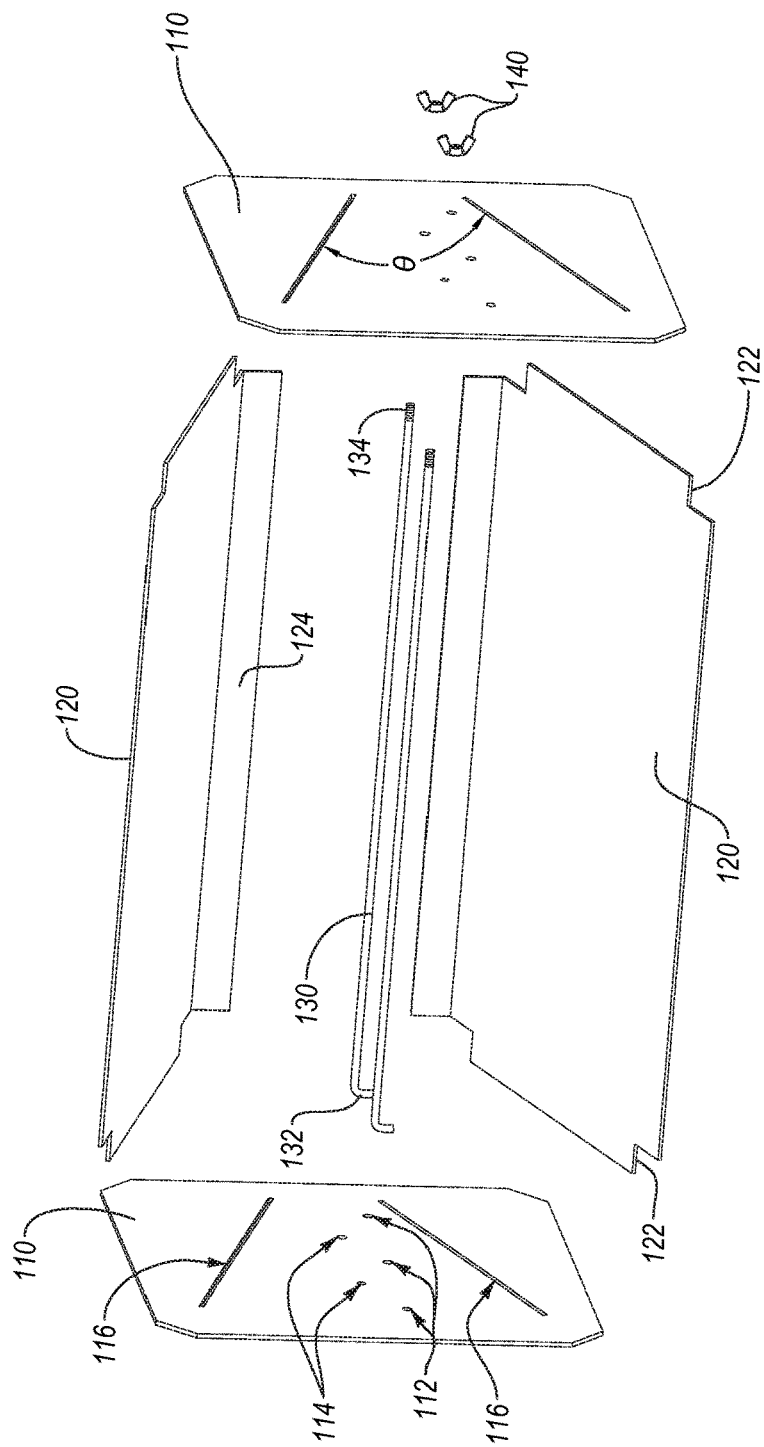
FIG. 8 is an exploded view of the reflector oven of FIG. 6.

FIG. 2 shows the first oven 10 set-up for using a cookie sheet 150. The oven features two identical top and bottom panels 120 which interface with two side panels 110. The interface is through two tabs 122 on each top and bottom panel 120 fitting through provided angled slots 116 (FIG. 7). The placement of the slots 116 corresponds to an angle made with the back fins 124 of the top and bottom panels (FIG. 3) so that the back fins 124 will be roughly vertical when assembled and the top and bottom panels will form an acute angle with each other. The panels are secured together by rods 130 which are slid through one set of vent holes 112, 114 (FIG. 7), of the side panels 110 and secured. Any means of securing the rods 130 may be utilized. The preferred embodiment utilizes a hook 132 on one end of the rod 130 and a threaded end 134 on the other. The rod 130 is slid through a hole such that a hook 132 abuts and will not pass through the hole. The threaded end passes through a corresponding hole in the other side panel 110 and is secured by a wingnut 140. This construction is preferred as it minimizes both the possibility of lost items (such as with using wing nuts 140 on both ends of the rods 130) and minimizes the need for tools as wingnuts may be easily hand tightened. Of course, other means are possible, such as using wingnuts on both ends, using a bulbous head or permanently fixed nut or some other obstruction on one end of the rod, or regular nuts on the threaded end. All that is required is that the rods are firmly connected to the oven.

Figure 5:
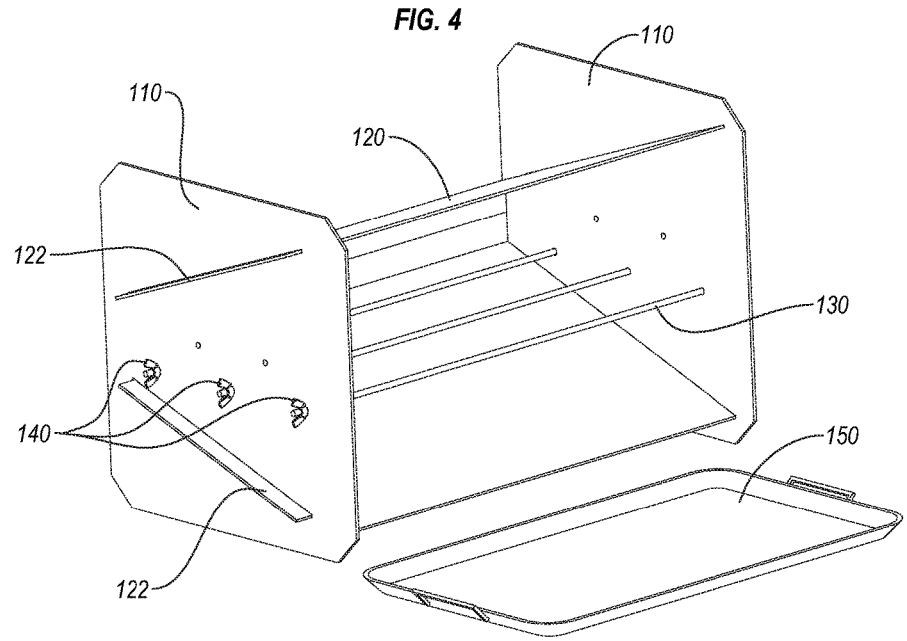
FIG. 5 is the reflector oven of FIG. 4, with the cookie sheet removed.
Figure 6:
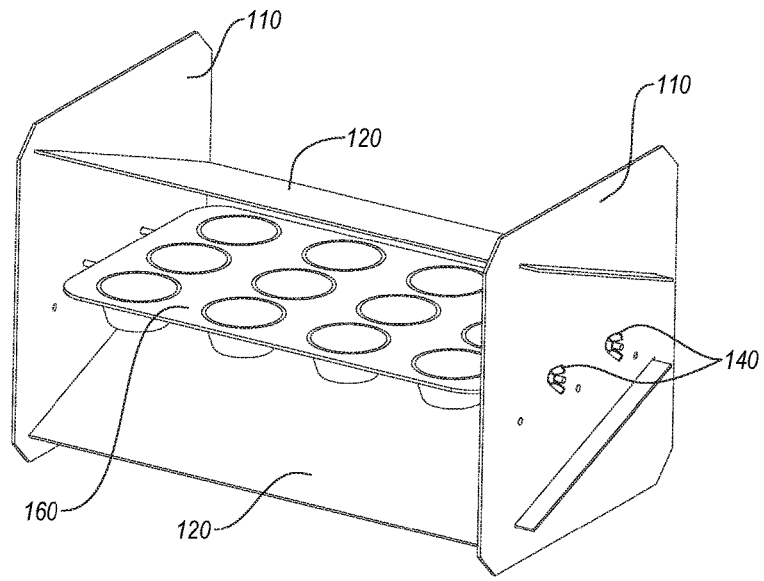
FIG. 6 is a front perspective view of the reflector oven of FIG. 2, assembled for use with a muffin tin.

Rods 130 also form the rack upon which the cooking surface, such as cookie sheet 150, is placed (FIGS. 2 and 5). As such, the holes for rods 130 are positioned slightly off the center of the side panels 110 as this facilitates central placement of the food. Another useful cooking surface is a muffin tin 160 (FIGS. 6 and 7). The oven of the present invention is designed to accommodate this surface. As seen in the Figures, there are two sets of holes 112, 114. The first set, 112, is a set of three holes in line to support a flat surface like cookie sheet 150. The second set, 114, is a set of two holes, set slightly higher, for use with a muffin tin 160. When assembled as shown in FIGS. 6 and 6, the muffin tin 160 sits on the two rods 130 with the central column of muffin cavities between the rods. This arrangement keeps the muffin tin 160 secure while cooking.

In use, as shown in FIG. 1, the reflector oven is assembled as desired and placed in front of a heat source, such as a campfire. It may then be moved closer or further from the heat source so as to increase or decrease temperature. Hand holes 128 may be provided to facilitate grasping the oven and moving it, but these are not necessary. Ideally, there should be enough mass in the oven to allow the back edges of the side plates 110 to remain cool during use. Heat emanating from the heat source is collected by the oven and concentrated and reflected by the top and bottom plates towards the food. It should also be noted that the oven may be used right-side up or upside-down, depending on the desired location of the food in the oven.

A metal construction is preferred for the oven, with a particular preference for aluminum alloys as they tend to reflect heat well, are relatively light for their durability and do not conduct heat well through the structure itself. Whatever metal chosen, it should be rigid, durable, reflective, and be slow to transmit heat. The angle $\theta$ between the top and bottom panels 120 may be almost any angle so long as it is open enough to gather heat and allow food to be places within the confines of the oven. It must also not be open so much as to not allow heat to escape. As such, both height and depth must be considered. The inventor has found that an angle $\theta$ that is 90° or lower is sufficient for most needs. The lower range of the angle would be dependent upon the length of the panels as longer panels would necessarily create a wider opening, regardless of the angle $\theta$ chosen. The ultimate size of the oven is variable. It may be made for a standard twelve-cavity muffin pan or an 11×16 inch cookie sheet, as shown in the figures, or it can be made for smaller standard size pans (10×15 or 9×13 inches), including smaller muffin tins, such as a six-cavity tin, or it may be made even smaller using specialized pan sizes. Reducing the size of the oven makes it more useful in a backpacking situation where all equipment must be ported. The oven may also be made larger, for family or large gathering camping scenarios, however added size would tend to require a larger heat source and probably more holes for ventilation and convection. Hinges may be utilized to movably connect pieces together, and thus reduce the number of separate parts necessary to manage during assembly and disassembly while also providing the appropriate interaction between the component parts.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A reflector oven comprising:
   a. identical top and bottom panels, the top and bottom panels each further comprising a bend forming a back fin and at least one side tab;
   b. two identical side panels, the side panels further comprising angular slots corresponding to the at least one side tab and at least two sets of holes defining at least two lines each panel having two sets of corresponding vent holes;
   c. a plurality of connecting rods with means of fastening the rods about the side panels;
   wherein the top and bottom panels are assembled with the side panels by inserting the at least one side tabs of the top and bottom panels into the angular slots of the side panels and threading the connecting rods selectively through one of either set of vent holes and fastening them to the side panels, the top and bottom panels contacting each other at their respective fins and such set of holes not used for the connecting rods serving as ventilation for the reflector oven.

2. The reflector oven of claim 1, at least one set of holes being only two holes and at least one other set of holes being three holes.

3. The reflector oven of claim 1, the means of fastening the connecting rods about side panels comprising a bend end of each rod couples with a threaded other end of each rod and a wingnut corresponding the threaded other end of the connecting rod, wherein each connecting rod is threaded through one hole in a set of holes of a first side panel and through a corresponding hole in a second side panel such that the bent end will interface with the first side panel and impede it connecting rod from traveling though the first side panel then the wingnut may be fastened about the threaded end as it passes through the second side panel.

4. The reflector oven of claim 1, the oven panels being manufactured from an aluminum alloy.

5. The reflector oven of claim 1, the angled slots forming an angle of no more than 90°.

6. The reflector oven of claim 1, the side panels each further comprising at least one handle.

* * * * *